(12) United States Patent
Takeyama

(10) Patent No.: US 8,390,923 B2
(45) Date of Patent: Mar. 5, 2013

(54) OPTICAL AMPLIFIER AND OPTICAL AMPLIFICATION METHOD

(75) Inventor: Tomoaki Takeyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 310 days.

(21) Appl. No.: 12/861,011

(22) Filed: Aug. 23, 2010

(65) Prior Publication Data

US 2011/0063721 A1 Mar. 17, 2011

(30) Foreign Application Priority Data

Sep. 16, 2009 (JP) .................. 2009-214653

(51) Int. Cl.
*H01S 3/00* (2006.01)
(52) U.S. Cl. ............ 359/337.4; 359/341.41; 359/341.42
(58) Field of Classification Search .................. 359/337, 359/337.4, 341.41, 341.42
See application file for complete search history.

(56) References Cited

U.S. PATENT DOCUMENTS

| 7,330,303 B2 * | 2/2008 | Sato et al. ................ 359/341.41 |
| 7,391,562 B2 * | 6/2008 | Kinoshita ................ 359/341.32 |
| 2006/0087723 A1 * | 4/2006 | Takeyama et al. ............ 359/337 |

FOREIGN PATENT DOCUMENTS

| JP | 10-144984 | 5/1998 |
| JP | 2003-258346 | 9/2003 |

* cited by examiner

*Primary Examiner* — Mark Hellner
(74) *Attorney, Agent, or Firm* — Staas & Halsey LLP

(57) ABSTRACT

There is provided an optical amplifier including a pump light source to generate a pump light being capable of changing a wavelength thereof, a first rare earth doped medium to amplify an input signal light by using the pump light generated by the pump light source, a second rare earth doped medium to amplify the input signal light output from the first rare earth doped medium by using a residual pump light that is a portion of the pump light generated by the pump light source, and a wavelength controller to control a wavelength of the pump light generated by the pump light source, based on an input level of the input signal light.

19 Claims, 12 Drawing Sheets

OPTICAL AMPLIFIER AND OPTICAL AMPLIFICATION METHOD

CROSS-REFERENCE TO RELATED APPLICATION

This application is based upon and claims the benefit of priority of the prior Japanese Patent Application No. 2009-214653, filed on Sep. 16, 2009, the entire contents of which are incorporated herein by reference.

FIELD

The embodiments discussed herein are related to an optical amplifier and an optical amplification method. The optical amplification method may use, for example, the optical amplifier that is capable of optically amplifying a signal light by using a pump light.

BACKGROUND

The development of a multimedia network has dramatically increased the demand for communications traffic. Therefore, for example, an optical transmission system that performs a multi-relay link by optically amplifying a wavelength division multiplexing (WDM) light by an optical amplifier using Erbium doped fiber (EDF) as an amplifying medium plays a large role in economization of communications system in the multimedia society.

Here, amplification efficiency of the EDF is large with respect to an input signal light in a C band (1530 nm to 1570 nm). Therefore, as a wavelength range of the WDM light, the C band is generally used. As a wavelength band of a pump light of the EDF, a band of 0.98 μm providing excellent noise figure (NF) and higher power in recent years may be used.

In an optical amplifier technology, for example, it is known that a structure in which a variable optical attenuator (VOA) is provided between a preceding-stage optical amplifying section (such as an EDF) and a following-stage optical amplifying section (such as an EDF). For example, Japanese Laid-open Patent Publication No. 2003-258346 discusses the following optical amplifier. The optical amplifier controls attenuation of a variable optical attenuator so that an output level of a preceding-stage gain controller that includes first and second optical amplifying sections and an output level of a following-stage gain controller that includes third and fourth optical amplifying sections become respectively a certain level. In addition, in order to distribute the attenuation so that the noise figure becomes an optimum value with respect to a plurality of variable optical attenuators when a device input level varies or when the amount of loss between the gain controllers varies due to dispersion compensation, the optical amplifier sets target gain values to respective second and fourth optical amplifying sections, to control the sum of gains from the first optical amplifying section to the fourth optical amplifying section to a certain value.

Japanese Laid-open Patent Publication No. 10-144984 discusses the following optical fiber amplifier. In the optical fiber amplifier, a signal light is amplified by using an Al added EDF to which pump light output from a pumping laser light source is supplied, the amplified signal light is then attenuated by a variable optical attenuator, and the signal light is further amplified by using a P/Al added EDF and the Al added EDF to which the pump light output from the pumping laser light source is supplied. Adding Al to the EDF makes it possible to equally disperse Erbium without crystallizing Erbium, and to widen an intense light generation band (1.55 μm band) in a C band. In addition, adding P to the EDF makes it possible to widen an amplification band in an L band.

In the above-described optical amplifiers, amplification gain in each EDF may be controlled to a certain value (auto gain control (AGC)) using a monitoring result obtained by monitoring the total power of the signal light (such as a WDM light) input to or output from each of the preceding-stage EDF and following-stage EDF. In addition, by changing the attenuation of the VOA provided between the EDFs, in accordance with variations in an input level of the signal light, the attenuation may be controlled so as to maintain a given output level while maintaining a flatness of an output wavelength characteristic with respect to the variations in the input level.

However, in the structure of each of the above-described optical amplifiers, a control loop of the AGC exists for each EDF. Therefore, the AGC may seem to be delayed by twofold when the number of waves of the input signal light is increased or decreased. In addition, in the structure of each of the above-described optical amplifiers, since the pump light source (such as a laser diode (LD)) is provided for each EDF, manufacturing costs of each optical amplifier is increased. Further, since pump light power demanded of each pump light source tends to increase, manufacturing costs of each pump light source may increase.

SUMMARY

According to an aspect of the embodiment, there is provided an optical amplifier including a pump light source to generate a pump light being capable of changing a wavelength thereof, a first rare earth doped medium to amplify an input signal light by using the pump light generated by the pump light source, a second rare earth doped medium to amplify the input signal light output from the first rare earth doped medium by using a residual pump light that is a portion of the pump light generated by the pump light source, and a wavelength controller to control a wavelength of the pump light generated by the pump light source, based on an input level of the input signal light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments will hereunder be described with reference to the drawings. However, the embodiments discussed below are merely illustrative, and do not exclude in any way various modifications and technologies not expressed in the embodiments discussed below. That is, the embodiments may be variously modified (for example, the embodiments and modifications may be combined) within a scope not departing from the gist of the embodiments.

First Embodiment

Exemplary Structure of Optical Amplifier 100

Figure 1:
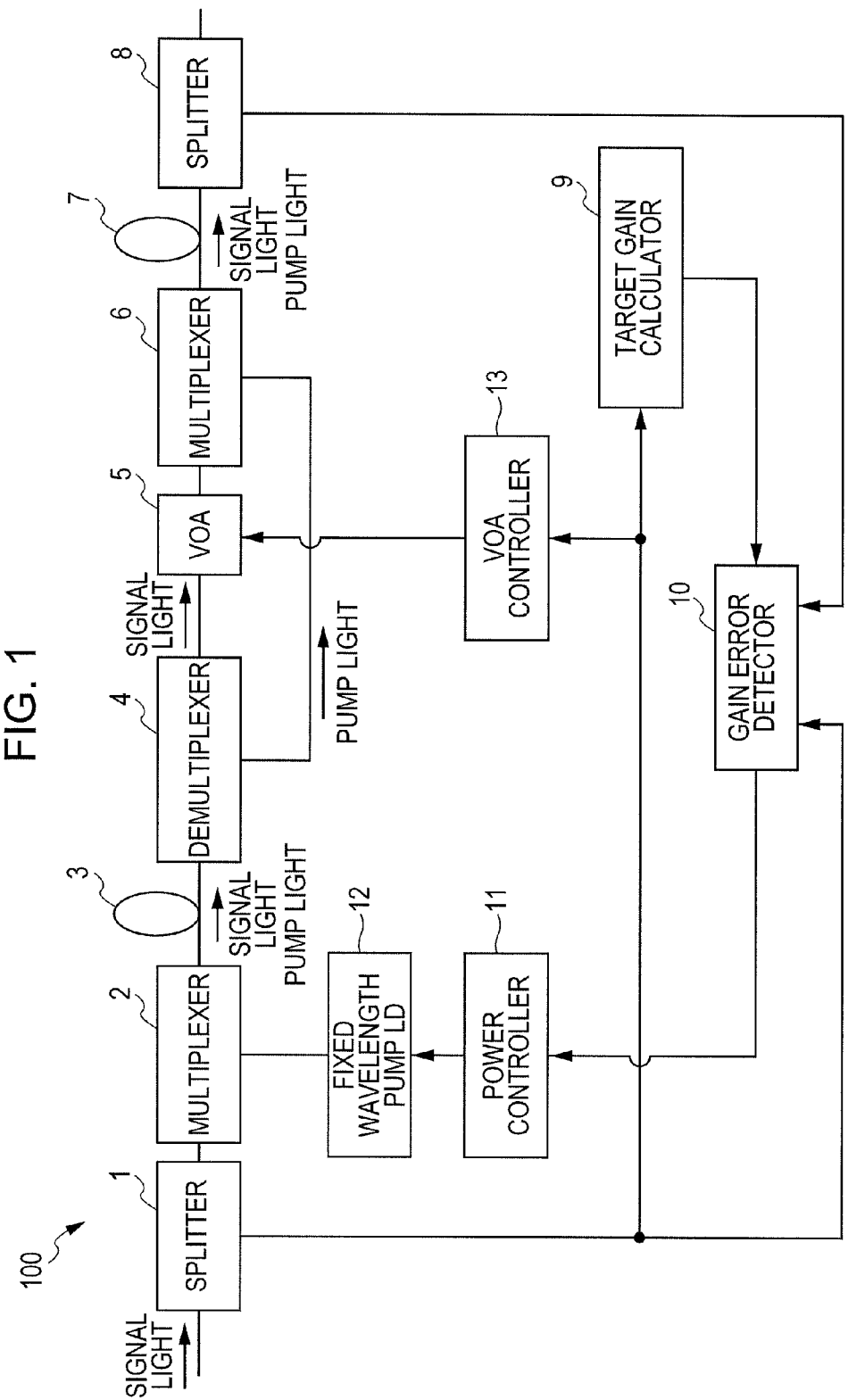
FIG. 1 illustrates an exemplary structure of an optical amplifier according to the first embodiment.

FIG. 1 illustrates an exemplary structure of an optical amplifier 100 according to a first embodiment. The optical amplifier 100 illustrated in FIG. 1 includes, for example, a splitter 1, a multiplexer 2, a first EDF 3, a demultiplexer 4, a VOA 5, a multiplexer 6, a second EDF 7, and a splitter 8. In addition, the optical amplifier 100 includes, for example, a target gain calculator 9, a gain error detector 10, a power controller 11, a fixed wavelength pump LD 12, and a VOA controller 13. Here, the splitter 1 branches power of an input signal light transmitted to the optical amplifier 100. For the splitter 1, for example, an optical branching unit, such as an optical coupler (splitter), may be used. The input signal light whose power is branched by the splitter 1 is distributed to the multiplexer 2, the target gain calculator 9, the gain error detector 10, and the VOA controller 13. The input signal light may be a WDM light or a signal light having a signal wavelength. A wavelength band of the input signal light may be, for example, a C band in which amplification efficiencies at the first EDF 3 and the second EDF 7 are large.

The fixed wavelength pump LD 12 generates a pump light having a previously set fixed wavelength. The pump light generated by the fixed wavelength pump LD 12 is input to the multiplexer 2. Here, a wavelength band of the pump light may be a 0.98 μm band at which contribution to amplifying the input signal light in the C band is large. The multiplexer 2 multiplexes the input signal light from the splitter 1 and the pump light from the fixed wavelength pump LD 12, and outputs the multiplexed light to the first EDF 3. For the multiplexer 2, for example, an optical multiplexing unit, such as an optical coupler, may be used.

The first EDF 3 is a rare earth doped medium (such as an optical fiber or a planar lightwave circuit (PLC)) that optically amplifies the input signal light by using the pump light from the fixed wavelength pump LD 12. For the first EDF 3, for example, a fiber doped with an ion of a rare earth element, such as Erbium (Er) or thulium (Tm), may be used. In addition, a fiber length of the first EDF 3 is desirably, for example, one that allows output of a portion of the pump light (residual pump light) to the following-stage second EDF 7 while absorbing a portion of the pump light generated by the fixed wavelength pump LD 12.

The demultiplexer 4 demultiplexes the input signal light optically amplified by the first EDF 3 and the pump light (residual pump light) output from the first EDF 3. For the demultiplexer 4, for example, a wavelength selection filter may be used. The signal light demultiplexed by the demultiplexer 4 is output to a path of the VOA 5, whereas the residual pump light demultiplexed by the demultiplexer 4 is output to a path that goes around the VOA 5. This makes it possible to input the signal light to the VOA 5, and to input the residual pump light to the second EDF 7 by causing the residual pump light to go around the VOA 5.

Due to control by the VOA controller 13, the VOA 5 attenuates the signal light from the demultiplexer 4. The signal light attenuated by the VOA 5 is input to the multiplexer 6. That is, the VOA 5 functions as an exemplary optical attenuator interposed between the first EDF 3 and the second EDF 7 and attenuating the input signal light amplified by the first EDF 3. The demultiplexer 4 functions as an exemplary demultiplexer interposed between the first EDF 3 and the VOA 5 and demultiplexing the residual pump light and causing the residual pump light to go around the VOA 5.

The multiplexer 6 multiplexes the signal light from the VOA 5 and the residual pump light that has gone around the VOA 5, and outputs the multiplexed light to the second EDF 7. For the multiplexer 6, for example, an optical multiplexing unit, such as an optical coupler, may be used. That is, the multiplexer 6 functions as an exemplary multiplexer inserted between the VOA 5 and the second EDF 7 and multiplexing the residual pump light demultiplexed by the demultiplexer 4 and inputting the multiplexed light to the second EDF 7.

The second EDF 7 is a rare earth doped medium (such as an optical fiber or a planar lightwave circuit (PLC)) that optically amplifies the signal light by using the residual pump light from the multiplexer 6. Similarly to the first EDF 3, for the second EDF 7, for example, a fiber having doped with an ion of a rare earth element, such as Erbium (Er) or thulium (Tm), may be used. In addition, a medium length (such as a fiber length) of the second EDF 7 is desirably one that is larger than the medium length of the first EDF 3 and that allows absorption of the residual pump light from the first EDF 3 without any leakage thereof. As illustrated in FIG. 1, a direction of the pump light at the first EDF 3 and the second EDF 7 in the optical amplifier 100 may be a forward pump direction.

The splitter 8 branches power of the signal light (output signal light) output from the second EDF 7. For the splitter 8, for example, an optical branching unit, such as an optical coupler (splitter), may be used. The output signal light whose power is branched by the splitter 8 is output from the optical amplifier 100 and distributed to the gain error detector 10.

The target gain calculator 9 detects an input level of the input signal light branched by the splitter 1. Using a result of the detection and an output level demanded of the optical amplifier 100, a target value of amplification gain in the optical amplifier 100 is calculated. For detecting the input level, for example, various optical detectors, such as a photodiode (PD), may be used. The target gain value calculated by the target gain calculator 9 is input to the gain error detector 10.

The gain error detector 10 calculates a current amplification gain from the input level of the input signal light branched by the splitter 1 and from the output level of the output signal light branched by the splitter 8. Then, using the current amplification gain and the target gain value calculated by the target gain calculator 9, the gain error detector 10 detects an error (gain error) between the amplification gain of the optical amplifier 100 for obtaining the demanded output level and the current amplification gain. The gain error detected by the gain error detector 10 is input to the power controller 11.

Using the gain error detected by the gain error detector 10, the power controller 11 controls the power of the pump light generated by the fixed wavelength pump LD 12. For example, when the gain error is positive, the power controller 11 determines that the current amplification gain is larger than the amplification gain for obtaining the demanded output level by the gain error, to perform control for reducing the power of the pump light. In contrast, for example, when the gain error is negative, the power controller 11 determines that the current amplification gain is less than the amplification gain for obtaining the demanded output level by the gain error, to perform control for increasing the power of the pump light.

The VOA controller 13 detects variations in the input level of the input signal light branched by the splitter 1, and controls attenuation (loss) at the VOA 5 by using the detected input level variations.

For example, the optical amplifier 100 having the above-described structure controls the pump light power by using, for example, the input level of the input signal light, and controls the amplification gain at each of the EDFs 3 and 7 so that the output level of the optical amplifier 100 becomes the demanded output level. In addition, for example, by using the variations of the input level of the input signal light, the optical amplifier 100 controls the loss at the VOA 5. This makes it possible for the optical amplifier 100 to obtain the demanded output level while maintaining a flatness of an output wavelength characteristic with respect to the variations in the input level.

The optical amplifier 100 causes the pump light that has leaked without being absorbed by the first EDF 3 (residual pump light) to go around the VOA 5 so as not to be attenuated by the VOA 5, and to be input again to the second EDF 7, so that the number of fixed wavelength pump LDs 12 is limited to 1. This makes it possible to reduce manufacturing costs of the optical amplifier. Further, when the number of AGC control loops is one, the optical amplifier 100 is capable of restricting AGC control delay when the number of waves of the input signal light is increased or decreased.

In order to obtain a flat output level independently of the variations in the input level of the input signal light, the optical amplifier 100 may include, for example, a gain equalizer (GEQ) disposed between the first EDF 3 and the second EDF 7.

One factor that determines the manufacturing costs of the optical amplifier 100 is the manufacturing costs of a pump light source (such as LD). For example, the larger a maximum pump light power that is capable of being generated by the pump light source, the higher the manufacturing costs of the pump light source.

Therefore, in order to further reduce the manufacturing costs of the optical amplifier 100, it is effective, for example, to reduce the maximum pump light power that is demanded of the LD. The maximum pump light power is determined by operation conditions of the optical amplifier including the LD. The operation conditions include, for example, the number of waves of the input signal light and the input level of the input signal light. The input signal light has, for example, level variations from a lower input limit to an upper input limit.

Figure 2:
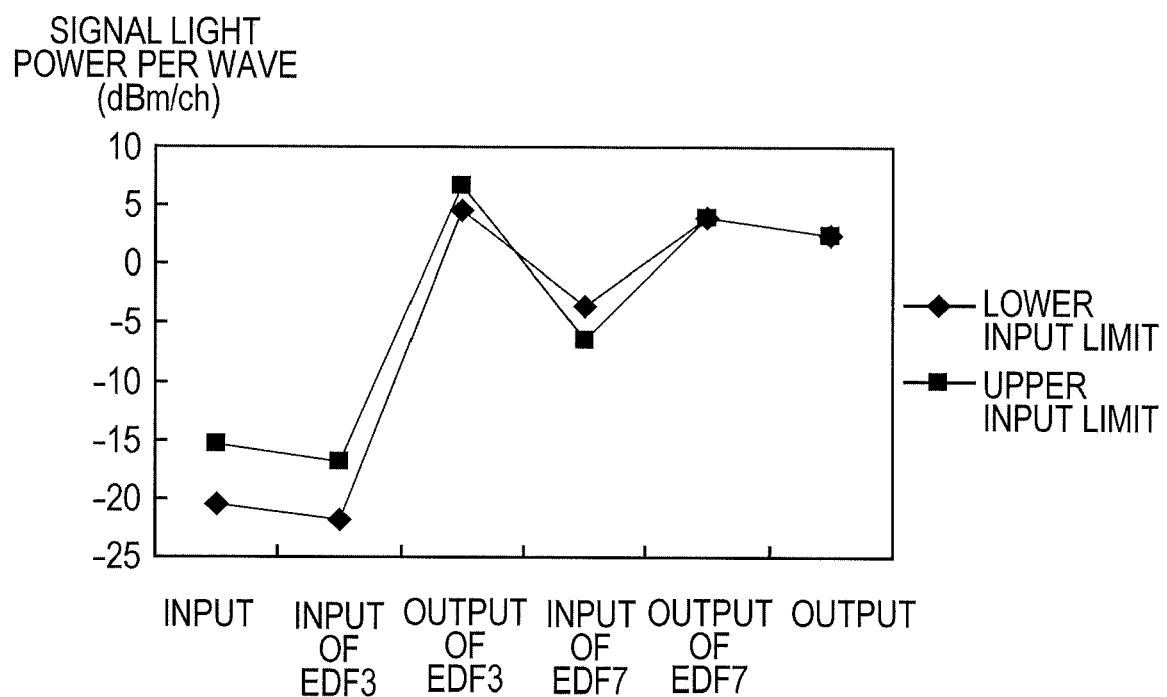
FIG. 2 is an exemplary diagram of levels of an input signal light.
Figure 3:
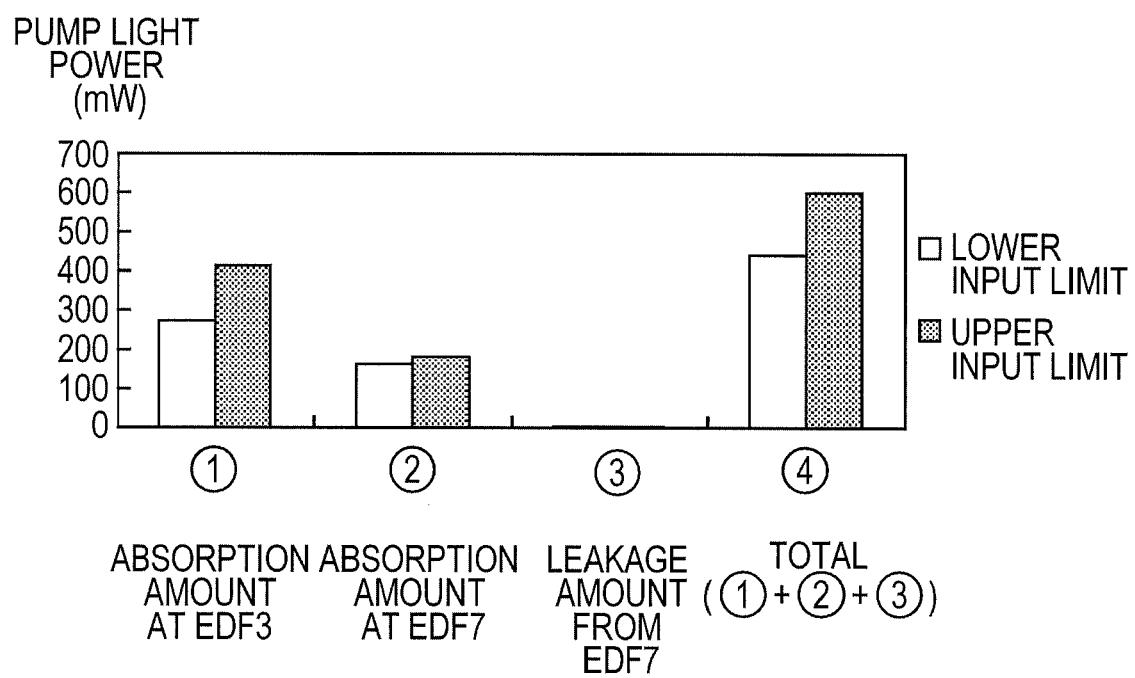
FIG. 3 illustrates exemplary pump light absorption amounts.

Here, input signal light conditions for a given maximum pump light power of the LD to become a maximum are described with reference to FIGS. 2 and 3. FIG. 2 is an exemplary diagram of levels of input signal light power per wavelength (dBm/ch). FIG. 3 illustrates an exemplary absorption amount at each of the EDFs 3 and 7 for pump light power (mW). Although, in FIGS. 2 and 3, the wavelength of the pump light is 981 nm, the wavelength of the pump light is not limited thereto.

First, when a signal light is input to the optical amplifier 100 and to the first EDF 3, as illustrated in FIG. 2, there is no change in the difference between the level at the upper input limit and the level at the lower input limit. Next, focusing attention on the output of the first EDF 3, the output level corresponding to the upper input limit is higher than the output level corresponding to the lower input limit. In contrast, focusing attention on the amplification gain of the first EDF 3, the amplification gain corresponding to the upper input limit is reduced than the amplification gain corresponding to the lower input limit. The reduction in the amplification gain results from amplification characteristics of the first EDF 3.

Focusing attention on the attenuation of the VOA 5 (the level difference between the output of the first EDF 3 and the input of the second EDF 7), attenuation corresponding to the upper input limit is larger than attenuation corresponding to the lower input limit by the level difference between the lower input limit and the upper input limit (that is, the signal corresponding to the upper input limit is attenuated larger). Further, focusing attention on the output of the second EDF 7 and the output of the optical amplifier 100, an output level corresponding to the upper input limit and an output level corresponding to the lower input level are substantially the same. At this time, the amplification gain of the second EDF 7 corresponding to the lower input limit is larger than the amplification gain of the second EDF 7 corresponding to the upper input limit.

Focusing attention on pump light amount absorbed by the first EDF 3 (hereunder referred to as "pump light absorption amount"), as illustrated in FIG. 3, the pump light absorption amount corresponding to the upper input limit is larger than the pump light absorption amount corresponding the lower input limit. Focusing attention on pump light absorption amount at the second EDF 7, the pump light absorption amount corresponding to the upper input limit is slightly larger than the pump light absorption amount corresponding to the lower input limit. However, the difference between the pump light absorption amounts at the second EDF 7 is less than the difference between the pump light absorption amounts at the first EDF 3.

Further, focusing attention on pump light amount that leaks from the second EDF 7 (hereunder referred to as "pump light leakage amount"), there is almost no pump light leakage at the upper input limit and the lower input limit. This is because the fiber length of the second EDF 7 is one that does not allow the leakage of the pump light.

As described above, since a given pump light power of the LD is dominated by the pump light absorption amount at the first EDF 3, the pump light power of the LD becomes a maximum when the input level of the input signal light is equal to the upper input limit. The values illustrated in FIGS. 2 and 3 are values per wavelength of the input signal light, so that the larger the number of wavelength on wavelength division multiplexing of the input signal light, the larger the pump light power of the LD. Therefore, when the number of wavelength on wavelength division multiplexing of the input signal light corresponds to the maximum number of wavelengths, and the input level of the input signal light is at the upper input limit, the given pump light power of the LD becomes a maximum. Accordingly, if, when the input level of the input signal light is high, the pump light absorption amount at the first EDF 3 is capable of being reduced, the maximum pump light power demanded of the LD is capable of being reduced, so that the manufacturing costs of the optical amplifier 100 is capable of being considerably reduced.

However, as mentioned above, the higher the input level of the input signal light, the larger the pump light absorption amount at the first EDF 3. Further, as the pump light absorption amount at the first EDF 3 is increased, power of the residual pump light reaching the second EDF 7 is reduced. Therefore, in order to provide the residual pump light power at the second EDF 7 while maintaining the output level of the optical amplifier 100 at a given level, a large pump light power is set during input to the first EDF 3.

As a result, when the number of wavelength on wavelength division multiplexing of the input signal light is large, or when the input level of the input signal light is high, an LD that is capable of generating a higher pump light power is installed. Therefore, the manufacturing cost of the optical amplifier 100 is increased. Accordingly, for example, the structure of the following optical amplifier 200 may be provided.

Second Embodiment

Exemplary Structure of Optical Amplifier 200

Figure 4:
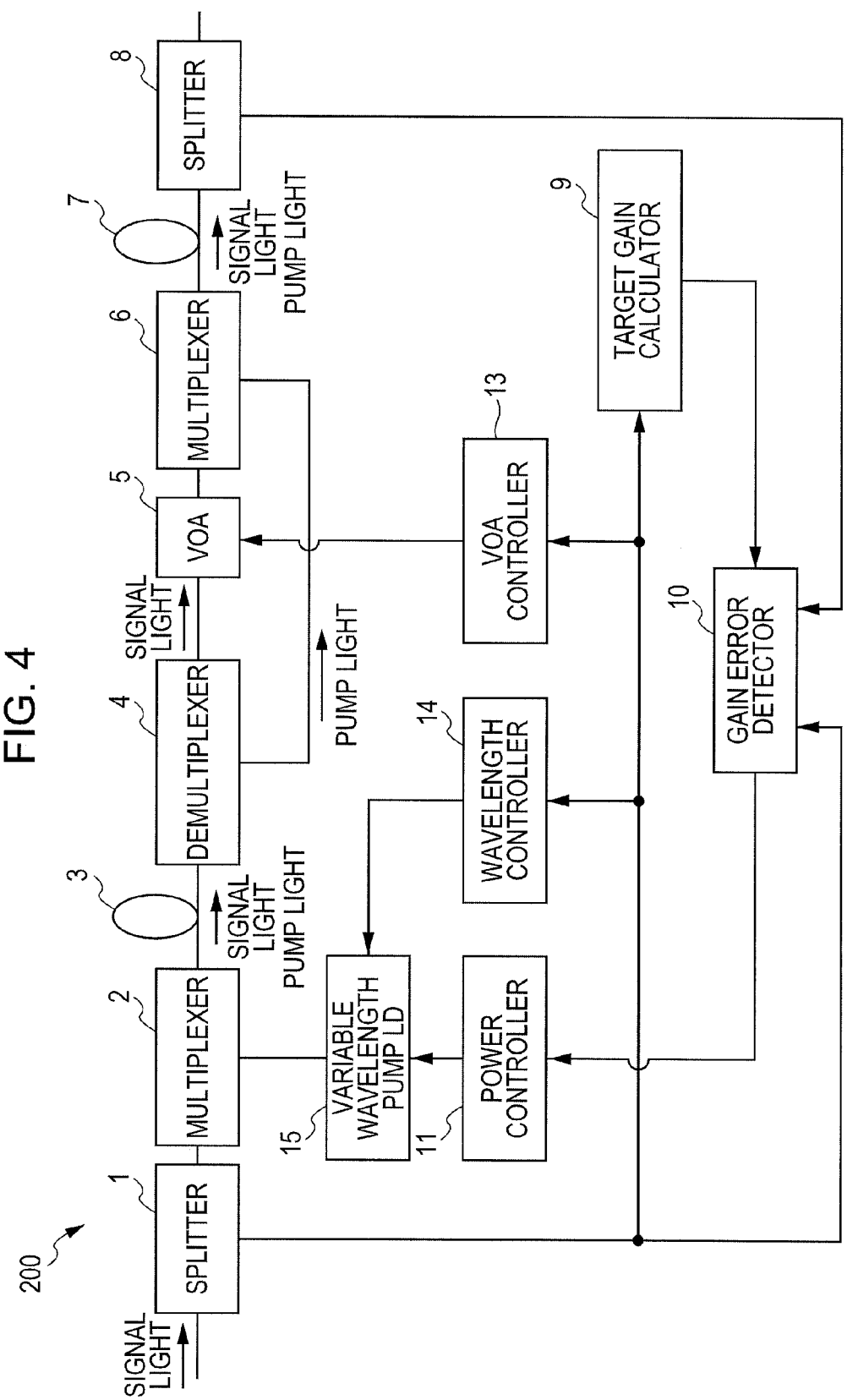
FIG. 4 illustrates an exemplary structure of an optical amplifier according to the second embodiment.

FIG. 4 illustrates an exemplary structure of the optical amplifier 200 according to the second embodiment. The optical amplifier 200 illustrated in FIG. 4 includes, for example, a splitter 1, a multiplexer 2, a first EDF 3, a demultiplexer 4, a VOA 5, a multiplexer 6, a second EDF 7, and a splitter 8. In addition, the optical amplifier 200 includes, for example, a target gain calculator 9, a gain error detector 10, a power controller 11, a VOA controller 13, a wavelength controller 14, and a variable wavelength pump LD 15. The splitter 1, the multiplexer 2, the first EDF 3, the demultiplexer 4, the VOA 5, the multiplexer 6, the second EDF 7, the splitter 8, the target gain calculator 9, the gain error detector 10, the power controller 11, and the VOA controller 13 have the same functions as those illustrated in FIG. 1.

Here, the variable wavelength pump LD 15 functions as a pump light source generating a pump light of variable wavelength. The variable wavelength pump LD 15, for example, generates the pump light having a variable wavelength according to control by the wavelength controller 14, and outputs it to the multiplexer 2. For the variable wavelength pump LD 15, for example, a variable wavelength laser or a combination of an LD that is capable of outputting pump light having a given bandwidth and a fiber bragg grating (FBG) at which a given wavelength is selectable may be used.

That is, the first EDF 3 functions as an exemplary first rare earth doped medium that amplifies input signal light by using the pump light output by the variable wavelength pump LD 15. The second EDF 7 functions as an exemplary second rare earth doped medium that further amplifies the amplified input signal light by using residual pump light output from the first EDF 3.

The wavelength controller 14 detects the input level of the input signal light branched by the splitter 1, and, using the detected input level, controls the wavelength of the pump light output from the variable wavelength pump LD 15. For example, as the input level increases, the wavelength controller 14 controls the wavelength of the pump light to a wavelength at which the pump light absorption amount at the first EDF 3 is small. For example, as the input level of the input signal light is increased, the wavelength controller 14 may control the wavelength of the pump light so that the pump light absorption amount at the first EDF 3 becomes smaller. In contrast, for example, as the input level of the input signal light is reduced, the wavelength controller 14 may control the wavelength of the pump light so that the pump light absorption amount at the first EDF 3 is increased.

Figure 5:
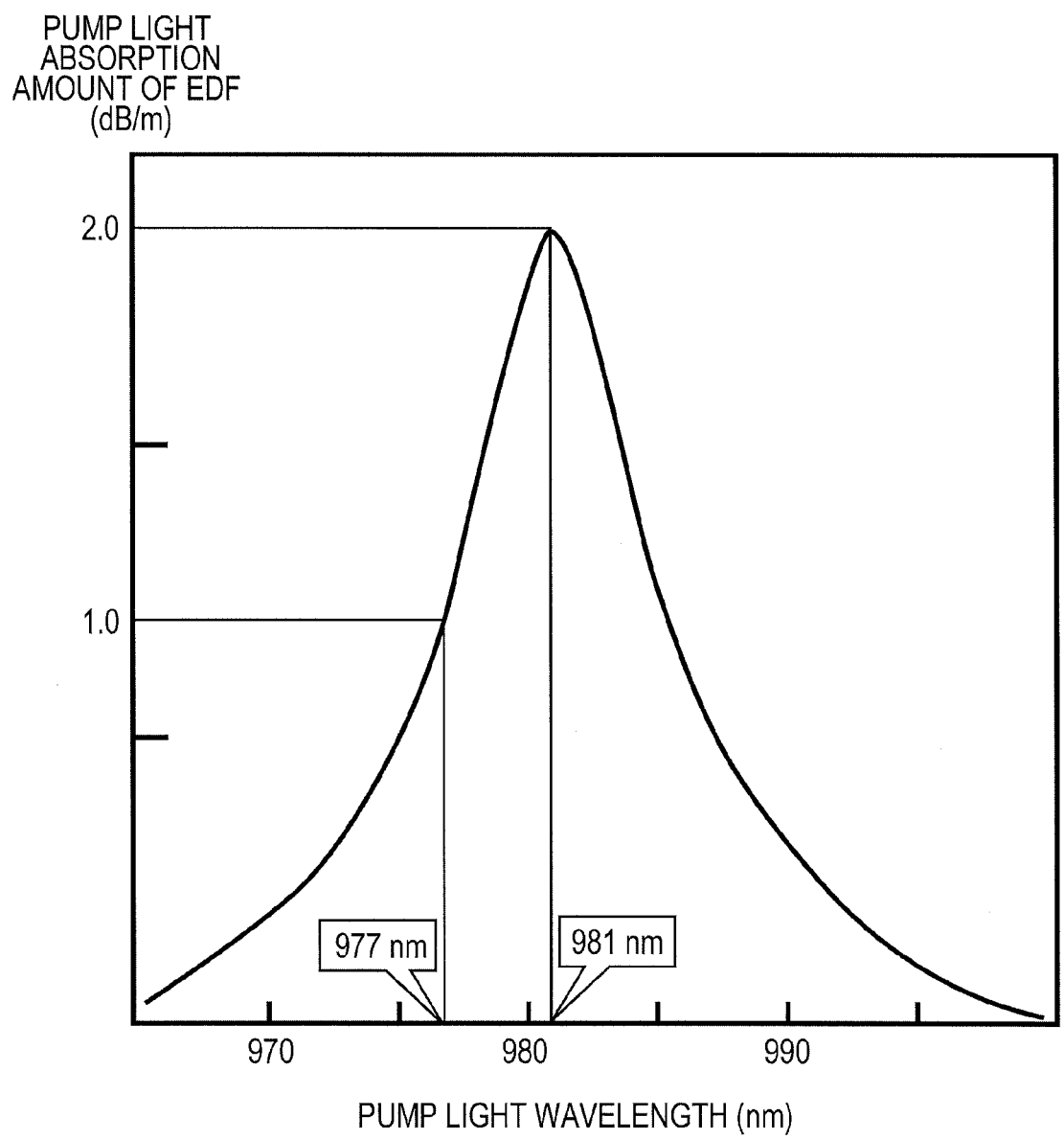
FIG. 5 illustrates an example of how the pump light absorption amount depends upon the wavelength at an EDF.

Here, FIG. 5 illustrates an example of how the pump light absorption amount depends upon wavelength at a 0.98 μm band of the first EDF 3 (or the second EDF 7). As illustrated in FIG. 5, for example, the pump light absorption amount at each of the EDF 3 and EDF 7 becomes a maximum with respect to pump light having a wavelength of 981 nm, whereas the pump light absorption amount at each of the EDF 3 and EDF 7 with respect to pump light having a wavelength of 977 nm becomes approximately half of the pump light absorption amount with respect to the pump light having the wavelength of 981 nm.

Therefore, as the input level of the input signal light is increased, it is possible to shift the wavelength of the pump light from the wavelength of 981 nm so as to reduce the pump light absorption amount at the first EDF 3. As a result, a maximum pump light power demanded of the LD (pump light source) is capable of being reduced. Here, the wavelength controller 14 according to the embodiment, for example, controls the wavelength of the pump light generated and output by the variable wavelength pump LD 15 using the relationship between the pump light wavelength and the input level illustrated in FIG. 6 obtained from the characteristics illustrated in FIG. 5.

Figure 6:
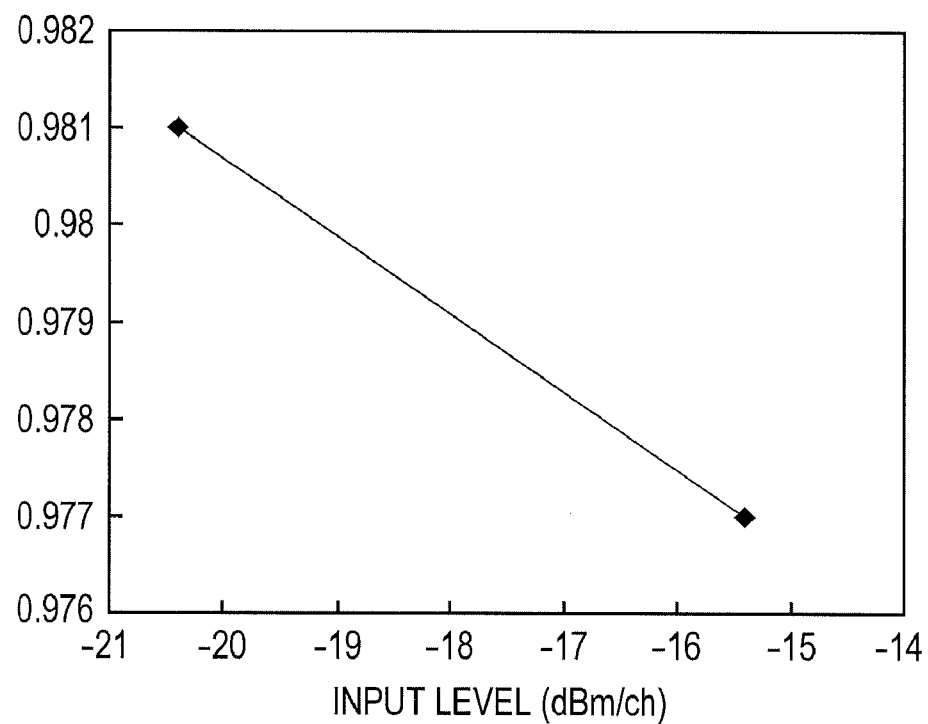
FIG. 6 illustrates an exemplary controlling method according to an embodiment.

As illustrated in FIG. 6, the wavelength controller 14, for example, controls the wavelength of the pump light generated and output by the variable wavelength pump LD 15 to approximately 981 nm when the input level is approximately −20.4 (dBm/ch). As the input level of the input signal light is increased, the wavelength of the pump light is shifted. When the input level becomes approximately −15.4 (dBm/ch), the wavelength controller 14 controls the wavelength of the pump light to, for example, approximately 977 nm. In contrast, when the input level of the input signal light becomes smaller, the wavelength controller 14 may, for example, perform control in a direction opposite to that of the aforementioned wavelength control.

As illustrated in FIG. 5, even if the wavelength of the pump light is increased from a center wavelength of 981 nm, and is shifted to approximately 985 nm, it is possible to provide a pump light absorption amount that is equivalent to the pump light absorption amount when the wavelength of the pump light is controlled to approximately 977 nm. Therefore, for example, as the input level of the input signal light is increased, the wavelength controller 14 is capable of shifting the wavelength of the pump light in a direction in which the wavelength is increased, to reduce the pump light absorption amount at the first EDF 3.

As described above, as the input level of the input signal light is increased, the optical amplifier 200 is capable of performing a shift control operation on the wavelength of the pump light to a wavelength at which the pump light absorption amount at each of the EDF 3 and the EDF 7 is small, to considerably reduce the pump light absorption amount at the first EDF 3. This makes it possible to increase the amount of residual pump light from the first EDF 3, so that the amount of residual pump light input to the second EDF 7 is capable of being increased.

Since the pump light absorption amount at the second EDF 7 is also reduced by the wavelength control, the pump light leakage amount from the second EDF 7 tends to increase. However, the fiber length of the second EDF 7 is previously set to a length that allows the pump light leakage amount to be sufficiently small. Therefore, the pump light leakage amount from the second EDF 7 becomes a negligible amount. From this viewpoint, it is desirable that the wavelength controller 14 performs the shift-control operation on the wavelength of the pump light so that the pump light leakage amount from the second EDF 7 is within a sufficiently negligible amount.

Since the output level of the signal light output from the first EDF 3 is reduced in accordance with the amount of reduction of the pump light absorption amount at the first EDF 3, the input level of the signal light to the second EDF 7 is also reduced, as a result of which pump light power to be set at the second EDF 7 tends to increase. However, this increase is limited to a very small amount. Amplification efficiency of the first EDF 3 is reduced in accordance with the amount of reduction of the pump light absorption amount at the first EDF 3. However, since the residual pump light amount input to the second EDF 7 is increased, amplification gain at the second EDF 7 is increased.

As mentioned above, as the input level of the input signal light is increased, the optical amplifier 200 is capable of performing a shift-control operation on the pump light wavelength to a wavelength at which the pump light absorption amount at the first EDF 3 becomes smaller, to reduce the pump light absorption amount at the first EDF 3. This makes it possible to considerably reduce a maximum pump light power demanded of the variable wavelength pump LD 15, and to reduce manufacturing costs of the optical amplifier 200.

Although there exists an NF (noise figure) for one performance measure of the optical amplifier 200, the NF has a property in which, the lower the input level of the input signal light, a better NF value is to be set. In general, the larger the pump light absorption amount at each EDF, the better the NF value at each EDF. Therefore, it is desirable that, the lower the input level of the input signal light, the wavelength of the pump light be controlled to a wavelength at which the pump light absorption amount at the first EDF 3 becomes larger (such as 981 nm). In contrast, as the input level of the input signal light is increased, a better NF value compared to the NF when the input level is low is no longer demanded. Therefore, the wavelength of the pump light is capable of being controlled to a wavelength at which the pump light absorption amount is small (such as 977 nm).

As described above, as the input level of the input signal light is increased, the optical amplifier 200 is capable of controlling the pump light wavelength to a wavelength at which the pump light absorption amount at the first EDF 3 is small, to increase the power of residual pump light reaching the second EDF 7. In addition, as the input level of the input signal light is reduced, it is possible to control the pump light wavelength so as to increase the pump light absorption amount, to set the NF to a more suitable value.

That is, the optical amplifier 200 is capable of reducing the maximum pump light power demanded of the pump light source (LD) by shifting the pump light wavelength in accordance with the input level of the input signal light. Therefore, it is possible to reduce the cost of the LD and to considerably reduce the manufacturing costs of the optical amplifier 200.

Exemplary Advantage

Here, an exemplary advantage obtained by the optical amplifier 200 will be described. For example, a case in which a wavelength division multiplexing light of a C band is input to the optical amplifier 200, and an output signal having an output level of 2.5 dBm/ch is considered. The wavelength division multiplexing light of the C band has a specification that, for example, a wavelength interval is 100 GHz; the number of waves is 40 waves; a lower input limit is −20.4 dBm/ch; and an upper input limit is −15.4 dBm/ch. Here, for example, when the input level is at the lower input limit, the wavelength controller 14 controls the wavelength of the pump light to 981 nm at which the pump light absorption amount at each of the EDF 3 and EDF 7 becomes a maximum (2.0 dB/m) (see FIG. 5).

In contrast, when, for example, the input level is at the upper input limit, the wavelength controller 14 controls the wavelength of the pump light to a wavelength (such as 977 nm) at which the pump light absorption amount at each of the EDF 3 and EDF 7 becomes less than (approximately half of) the pump light absorption amount when the pump light wavelength is 981 nm. The pump light absorption amount at each of the EDF 3 and EDF 7 is less than the pump light absorption amount when the pump light wavelength is 981 nm, so that the wavelength controller 14 may control the wavelength of the pump light when the input level is at the upper input limit to a wavelength differing from 977 nm (such as 985 nm).

Further, when the input level is between the lower input limit and the upper input limit, the wavelength controller 14 may control the wavelength of the pump light by using a given relational expression. For example, as illustrated in FIG. 6, the expression expressed by a point where the input level is at the lower input limit (−20.4 dBm/ch) and the pump light wavelength is 981 nm and by a point where the input level is at the upper input limit (−15.4 dBm/ch) and the pump light wavelength is 977 nm may be used. In this case, the relational expression is represented by the following Expression (1).

$$\text{Pump Light Wavelength}(\mu m) = (0.977 - 0.981) / \{(-15.4) - (-20.4)\} \times \text{input level}(dBm/ch) + 0.96468 \quad (1)$$

Wherein the input level satisfies the conditions (−20.4≦input level≦−15.4). The Relational Expression (1) is merely an example, so that the relational expression is not limited thereto. For example, the relational expression may be one in which the value of the pump light wavelength is reduced in a staircase pattern as the input level is increased.

The variable wavelength pump LD 15 is provided with, for example, a variable wavelength FBG at an output end of the LD. The wavelength controller 14 is capable of variably controlling an oscillation wavelength of the LD by controlling the variable wavelength FBG. Further, in the embodiment, for example, the fiber length of the first EDF 3 is 10 m so as to allow residual pump light to leak from the first EDF 3; whereas the fiber length of the second EDF 7 is 15 m for reducing the residual pump light leakage amount from the second EDF 7.

In the optical amplifier 200 having the above-described structure, when pump light having a wavelength of 981 nm is incident thereupon, the NF of the optical amplifier 200 at the lower input limit becomes 4.78 dB. When pump light having a wavelength of 977 nm is incident upon the optical amplifier 200, the NF of the optical amplifier 200 at the lower input limit becomes 4.89 dB, which is less than approximately 0.11 dB of the NF when the pump light having a wavelength of 981 nm is incident upon the optical amplifier 200. From this also, it is understood that the pump light wavelength at the lower input limit is desirably 981 nm.

In contrast, when the pump light having a wavelength of 977 nm is incident upon the optical amplifier 200, the NF of the optical amplifier 200 at the upper input limit becomes 5.85 dB. When the pump light having a wavelength of 981 nm is incident upon the optical amplifier 200, the NF of the optical amplifier 200 at the upper input limit becomes 5.48 dB, which is less than approximately 0.37 dB of the NF when the pump light having a wavelength of 977 nm is incident upon the optical amplifier 200.

However, an optical signal noise ratio (OSNR) indicating transmission performance of the optical amplifier 200 including a transmission line is proportional to the NF of the optical amplifier 200, and is increased in proportion to the input level. In general, the OSNR at the lower input limit and OSNR at the upper input limit are equivalent to each other, so that the NF at the upper input limit is a sufficient value when it is 4.78 dB+5 dB=9.78 dB or less. Wherein 4.78 dB is the NF at the lower input limit and 5 dB is a difference between the upper input limit (−15.4 dBm) and the lower input limit (−20.4 dBm). Therefore, it is understood that the NF at the upper input limit is a sufficient value when the NF=5.85 dB at the pump light wavelength of 977 nm.

Next, a given pump light power of the variable wavelength pump LD 15 in the optical amplifier 200 having the above-described structure will be described. Here, when the input level is at the lower input limit, the pump light wavelength is controlled to 977 nm, whereas, when the input level is at the upper input limit, the pump light wavelength is controlled to 981 nm. It has already been mentioned that the pump light power of the variable wavelength pump LD 15 becomes a maximum when the input level is at the upper input limit.

Figure 7:
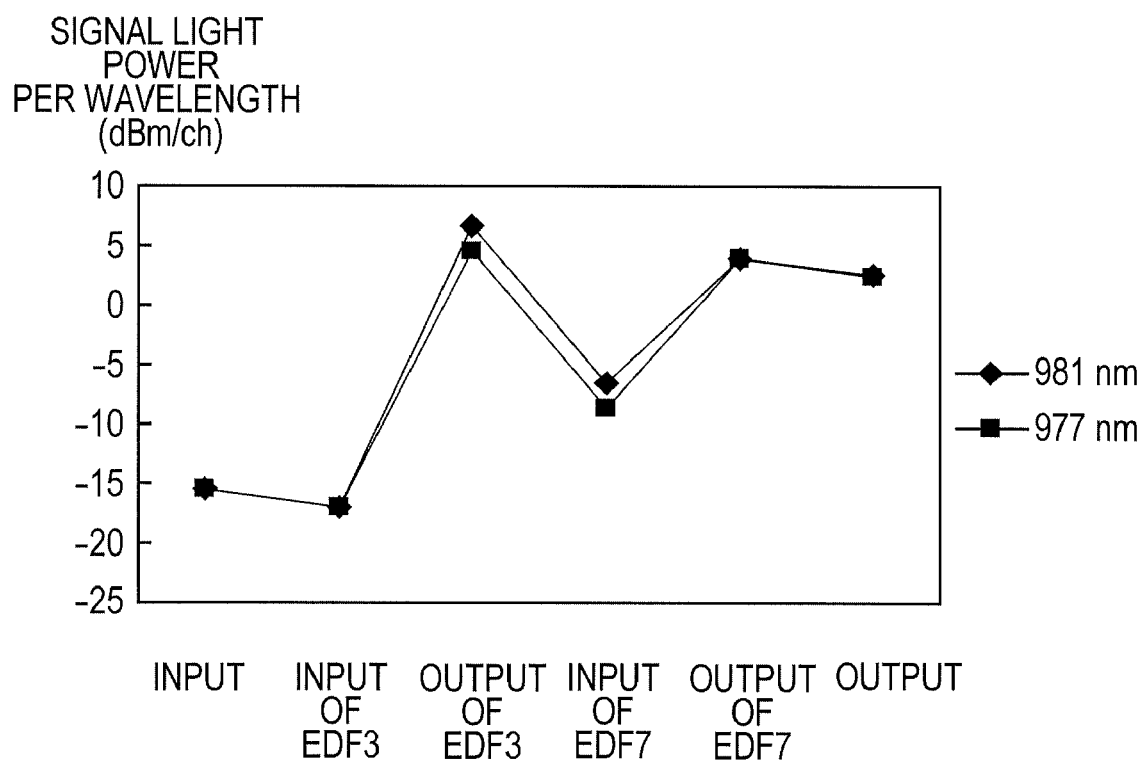
FIG. 7 illustrates an exemplary diagram of levels of an input signal light.
Figure 8:
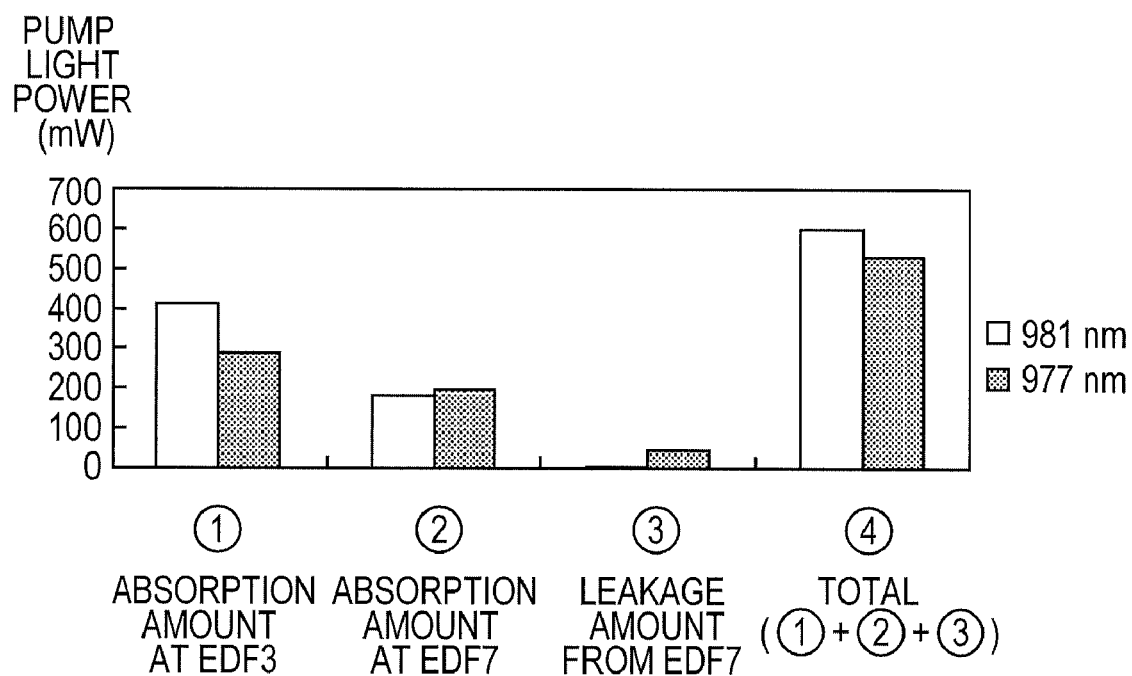
FIG. 8 illustrates exemplary pump light absorption amounts.
Figure 9:
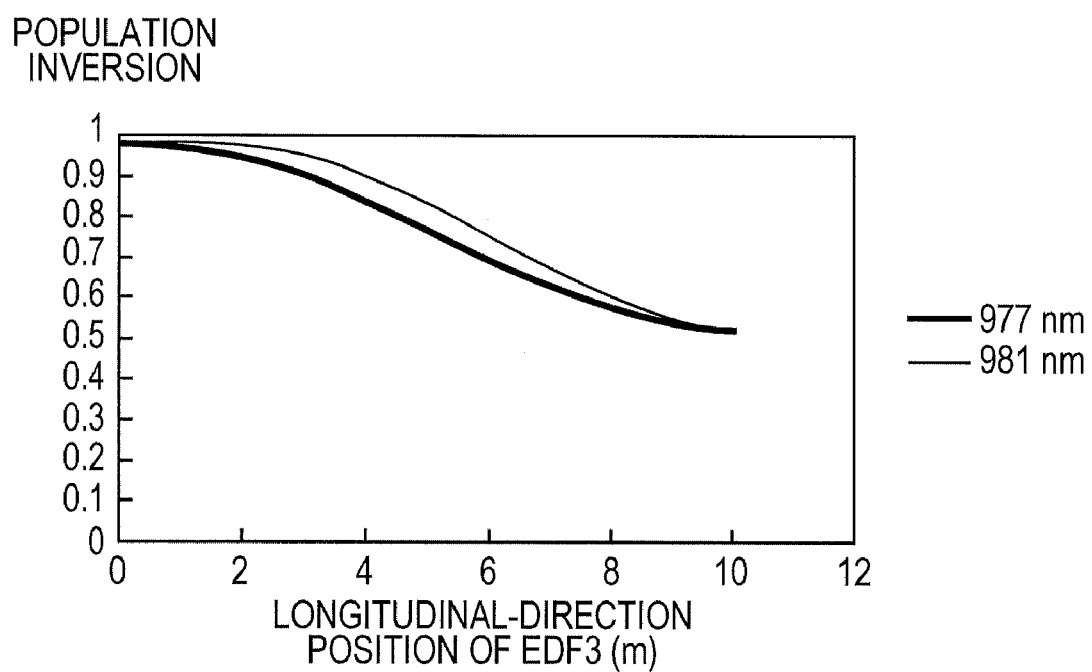
FIG. 9 illustrates an exemplary population inversion in a first EDF.
Figure 10:
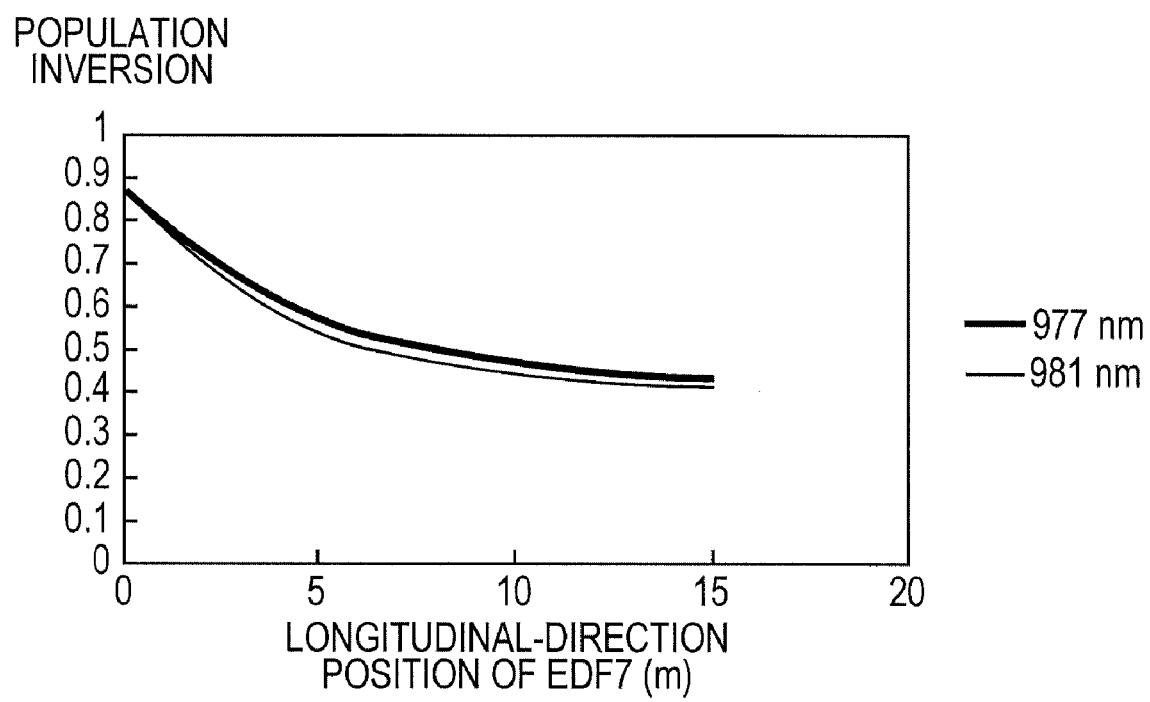
FIG. 10 illustrates an exemplary population inversion in a second EDF.

FIG. 7 illustrates an exemplary diagram of a level of input signal light power (dBm/ch) per wavelength for each pump light wavelength. FIG. 8 illustrates an exemplary absorption amount at each of the EDF 3 and EDF 7 for the pump light power (mW) of the corresponding pump light wavelength. For reference, exemplary population inversions in a longitudinal direction of the first EDF 3 and the second EDF 7 at the upper input limit when the respective pump lights are incident thereupon are illustrated in FIGS. 9 and 10, respectively.

First, as illustrated in FIG. 7, the input signal levels (signal light powers) at the respective pump light wavelengths do not differ from each other when an input signal light is input to the optical amplifier 200 and to the first EDF 3 according to the embodiment.

Next, focusing attention on input/output of the first EDF 3, the input levels are the same, whereas an output level corresponding to the pump light having a wavelength of 981 nm is higher than an output level corresponding to the pump light having a wavelength of 977 nm. This is because, when the pump light wavelength is shifted from 981 nm to 977 nm, the pump light absorption amount at the first EDF 3 is reduced (see FIG. 5), and the amplification efficiency at the first EDF 3 is reduced.

Focusing attention on input/output of the second EDF 7, whereas the input level corresponding to the pump light having a wavelength of 981 nm is higher than the input level corresponding to the pump light having a wavelength of 977 nm, the output levels are the same. This is because, when the pump light wavelength is shifted from 981 nm to 977 nm, the amount of residual pump light from the first EDF 3 is increased, and amplification efficiency of the second EDF 7 is increased.

Focusing attention on pump light absorption amount at the first EDF 3, as illustrated in FIG. 8, a pump light absorption amount of the pump light having a wavelength of 977 nm is less than a pump light absorption amount of the pump light having a wavelength of 981 nm.

Focusing attention on pump light absorption amount of the second EDF 7, as illustrated in FIG. 8, a pump light absorption amount of the pump light having a wavelength of 977 nm is slightly greater than a pump light absorption amount having a wavelength of 981 nm. This expresses that the amount of residual pump light from the first EDF 3 is increased by shifting the pump light wavelength from 981 nm to 977 nm.

Further, focusing attention on pump light leakage amount from the second EDF 7, as illustrated in FIG. 8, a pump light leakage amount of the pump light having a wavelength of 977 nm is slightly greater than a pump light leakage amount of the pump light having a wavelength of 981 nm. This also expresses that the amount of residual pump light from the first EDF 3 is increased by shifting the pump light wavelength from 981 nm to 977 nm.

Here, focusing on the total of the pump light absorption amount of the first EDF 3, the pump light absorption amount of the second EDF 7, and the pump light leakage amount of the second EDF 7 (that is, the given pump light power of the variable wavelength pump LD 15), whereas the power becomes 600 mW when the pump light having a wavelength of 981 nm is used, the power becomes 531 mW when the pump light having a wavelength of 977 nm is used. This expresses that the maximum pump light power of the variable wavelength pump LD 15 included in the optical amplifier 200 is capable of being reduced by 69 mW.

Accordingly, in the embodiment, by controlling the pump light wavelength as mentioned above in accordance with the input level to the optical amplifier 200, it is possible to reduce the maximum pump light power of the variable wavelength pump LD 15, and to reduce the cost of the variable wavelength pump LD 15. Therefore, it is possible to considerably reduce the manufacturing costs of the optical amplifier 200.

Third Embodiment

Although, in the above-described embodiments, the wavelength of each pump light is controlled on the basis of the input level of the input signal light, for example, it is possible to control a power ratio of pump lights having different wavelengths output from a plurality of pump light sources that is capable of generating and outputting the plurality of pump lights.

Figure 11:
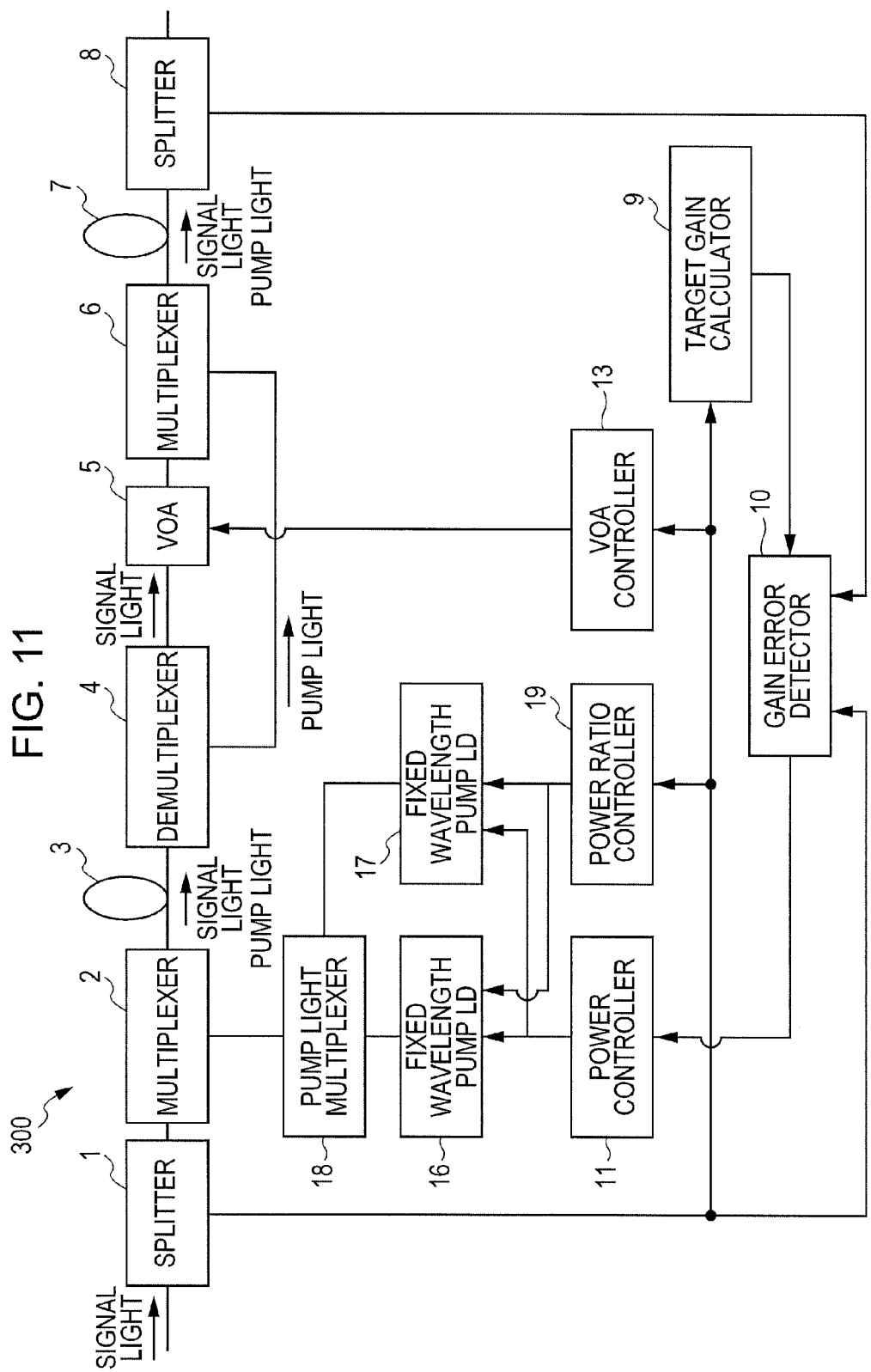
FIG. 11 illustrates an exemplary structure of an optical amplifier according to the third embodiment.

FIG. 11 illustrates an exemplary structure of an optical amplifier 300 according to the third embodiment. The optical amplifier 300 illustrated in FIG. 11 includes, for example, a splitter 1, a multiplexer 2, a first EDF 3, a demultiplexer 4, a VOA 5, a multiplexer 6, a second EDF 7, and a splitter 8. In addition, the optical amplifier 300 includes, for example, a target gain calculator 9, a gain error detector 10, a power controller 11, a VOA controller 13, a first fixed wavelength pump LD 16, a second fixed wavelength pump LD 17, a pump light multiplexer 18, and a power ratio controller 19. The splitter 1, the multiplexer 2, the first EDF 3, the demultiplexer 4, the VOA 5, the multiplexer 6, the second EDF 7, the splitter 8, the target gain calculator 9, the gain error detector 10, the power controller 11, and the VOA controller 13 have the same functions as those illustrated in FIG. 1.

Here, the first fixed wavelength pump LD (first pump light source) 16 generates pump light having a previously set fixed wavelength (first wavelength), and outputs it. The second fixed wavelength pump LD (second pump light source) 17 generates pump light having a wavelength (second wavelength) differing from the wavelength (first wavelength) of the pump light generated by the first fixed wavelength pump LD 16, and outputs it. In the embodiment, the first wavelength may be, for example, 981 nm, and the second wavelength may be, for example, 977 nm.

The pump light multiplexer 18 multiplexes the output from the first fixed wavelength pump LD 16 and the output from the second fixed wavelength pump LD 17 so as to output pump light subjected to wavelength division multiplexing. The pump light multiplexed by the pump light multiplexer 18 is input as the pump light subjected to the wavelength division multiplexing to the first EDF 3 through the multiplexer 2.

The power ratio controller 19 controls the ratio between power of the pump light having the first wavelength and power of the pump light having the second wavelength included in the pump light subjected to the wavelength division multiplexing, on the basis of the input level of the input signal light. For example, as the input level of the input signal light increases, the power ratio controller 19 according to the embodiment may increase the power ratio of the pump light having the second wavelength among the pump lights included in the pump light subjected to the wavelength division multiplexing.

Figure 12:
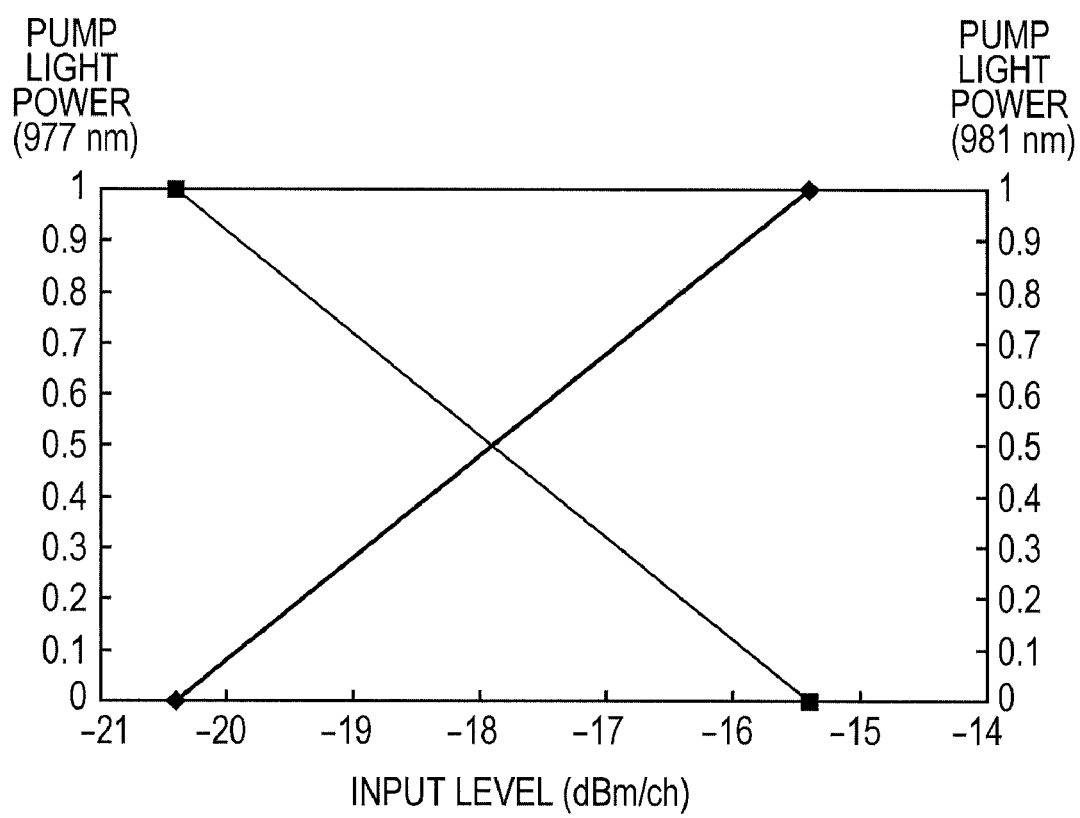
FIG. 12 illustrates an exemplary controlling method according to a first modification.

Here, an exemplary controlling method at the power ratio controller 19 will be described with reference to FIG. 12. For example, as illustrated in FIG. 12, when the input level is at the lower input limit (−20.4 dBm/ch), the power ratio controller 19 controls the power ratio of the LDs 16 and 17 so that the first wavelength (such as 981 nm) alone is included in the pump light subjected to the wavelength division multiplexing. On the other hand, when the input level is at the upper input limit (−15.4 dBm/ch), the power ratio controller 19 controls the power ratio of the LDs 16 and 17 so that the second wavelength (such as 977 nm) alone is included in the pump light subjected to the wavelength division multiplexing.

When the input level is between the lower input limit and the upper input limit, for example, the power ratio controller 19 controls the power ratio of the LDs 16 and 17 so that, as the input level is increased, the power of the pump light having the second wavelength included in the pump light subjected to the wavelength division multiplexing is increased, whereas the power ratio of the pump light having the first wavelength is reduced.

Even when this is done, advantages similar to those of the above-described embodiments are provided, and the variable wavelength LD is disused. Therefore, it is possible to further reduce manufacturing costs of the optical amplifier 300.
Other The structures and operations of the respective optical amplifiers 100, 200, and 300 described above may be selected or used in combination appropriately. The demultiplexer 4, the VOA 5, the multiplexer 6, the second EDF 7, and the VOA controller 13, provided between the first EDF 3 and the splitter 8, are not limited in number to that in each of FIGS. 1, 2, and 11.

The combination of the first wavelength and the second wavelength in each of the embodiments is merely one example. The pump light absorption amount for the second wavelength may be any value as long as it is less than the pump light absorption amount for the first wavelength at the first EDF 3 or the second EDF 7.

In addition, for example, the fiber length of the first EDF 3 may be a length that allows the residual pump light to leak out to the following-stage second EDF 7, and the fiber length of the second EDF 7 may be a length that allows the residual pump light from the first EDF 3 to be absorbed without leaking.

Further, although, in the third embodiment, the power ratio between two different wavelengths is explained, a power ratio between three or more different wavelengths may be controlled to reduce the pump light absorption amount at the first EDF 3.

In the embodiments, the component parts (the target gain calculator 9, the power controller 11, the VOA controller 13, the wavelength controller 14, and the power ratio controller 19) detect the input level of the input signal. However, the input level may be supplied to each of these component parts from the outside.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. An optical amplifier comprising:
a pump light source to generate a pump light being capable of changing a wavelength thereof;
a first rare earth doped medium to amplify an input signal light by using the pump light generated by the pump light source;
a second rare earth doped medium to amplify the input signal light output from the first rare earth doped medium by using a residual pump light that is a portion of the pump light generated by the pump light source; and
a wavelength controller to control a wavelength of the pump light generated by the pump light source, based on an input level of the input signal light.
2. The optical amplifier according to claim 1, wherein the wavelength controller controls the wavelength of the pump light so that, as the input signal level increases, the wavelength of the pump light changes to a wavelength at which an absorption amount of the pump light in the first rare earth doped medium becomes smaller.
3. The optical amplifier according to claim 1, wherein the wavelength of the pump light is in a band of 0.98 μm.
4. The optical amplifier according to claim 1, wherein the pump light source includes a fiber bragg grating of being wavelength-tunable.
5. The optical amplifier according to claim 1, wherein a length of the second rare earth doped medium is longer than a length of the first rare earth doped medium.
6. The optical amplifier according to claim 1, further comprising:
an optical attenuator to attenuate the input signal light amplified by the first rare earth doped medium, the optical attenuator interposing between the first rare earth doped medium and the second rare earth doped medium;
a demultiplexer to divide the input signal light amplified by the first rare earth doped medium between the input signal light and the residual pump light, the residual pump light divided by the demultiplexer being output to a path that goes around the optical attenuator, the demultiplexer interposing between the first rare earth doped medium and the optical attenuator; and
a multiplexer to multiplex the input signal light from the optical attenuator and the residual pump light demultiplexed by the demultiplexer, a signal light multiplexed by the multiplexer being input to the second rare earth doped medium, the multiplexer interposing between the optical attenuator and the second rare earth doped medium.
7. The optical amplifier according to claim 1, wherein the input signal light is a wavelength division multiplexing light.

8. The optical amplifier according to claim 1, wherein a wavelength of the input signal light is in a C band.

9. The optical amplifier according to claim 1, wherein a direction of the pump light at the first rare earth doped medium and the second rare earth doped medium is a forward pump direction.

10. An optical amplifier comprising:
a first pump light source to generate a pump light having a first wavelength;
a second pump light source to generate a pump light having a second wavelength differing from the first wavelength;
a pump light multiplexer to multiplex the pump lights output from the first pump light source and the pump light output from the second pump light source so as to generate the pump lights subjected to wavelength division multiplexing;
a first rare earth doped medium to amplify an input signal light by using the pump lights multiplexed by the pump light multiplexer;
a second rare earth doped medium to amplify the input signal light output from the first rare earth doped medium by using a residual pump light that is a portion of the pump light generated by the pump light source; and
a power ratio controller to control a ratio between power of the pump light having the first wavelength and power of the pump light having the second wavelength in the pump lights multiplexed by the pump light multiplexer, based on an input level of the input signal light.

11. The optical amplifier according to claim 5, wherein an absorption amount of the pump light having the second wavelength is smaller than the absorption amount thereof having the first wavelength in the first rare earth doped medium.

12. The optical amplifier according to claim 6, wherein the power ratio controller controls one of power of the pump light having the first wavelength and power of the pump light having the second wavelength so that, as the input level of the input signal light increases, the power of the pump light having the second wavelength is larger than the power of the pump light having the first wavelength in the pump light multiplexed.

13. The optical amplifier according to claim 5, wherein the wavelengths of the first pump light and the second pump light are in a band of 0.98 μm.

14. The optical amplifier according to claim 5, wherein a length of the second rare earth doped medium is longer than a length of the first rare earth doped medium.

15. The optical amplifier according to claim 5, further comprising:
an optical attenuator to attenuate the input signal light amplified by the first rare earth doped medium, the optical attenuator interposing between the first rare earth doped medium and the second rare earth doped medium;
a demultiplexer to divide the input signal light amplified by the first rare earth doped medium between the input signal light and the residual pump light, the residual pump light divided by the demultiplexer being output to a path that goes around the optical attenuator, the demultiplexer interposing between the first rare earth doped medium and the optical attenuator; and
a multiplexer to multiplex the input signal light from the optical attenuator and the residual pump light demultiplexed by the demultiplexer, a signal light multiplexed by the multiplexer being input to the second rare earth doped medium, the multiplexer interposing between the optical attenuator and the second rare earth doped medium.

16. The optical amplifier according to claim 5, wherein the input signal light is a wavelength division multiplexing light.

17. The optical amplifier according to claim 5, wherein a wavelength of the input signal light is in a C band.

18. The optical amplifier according to claim 5, wherein a direction of the pump light at the first rare earth doped medium and the second rare earth doped medium is a forward pump direction.

19. An optical amplification method for an optical amplifier including a pump light source to generate a pump light, a first rare earth doped medium to amplify an input signal light by using the pump light generated by the pump light source, and a second rare earth doped medium to amplify the input signal light output from the first rare earth doped medium by using a residual pump light that is a portion of the pump light generated by the pump light source, the optical amplification method comprising;
monitoring an input level of the input signal light; and
controlling a wavelength of the pump light so that, as the input signal level increases, the wavelength of the pump light changes to a wavelength at which an absorption amount of the pump light in the first rare earth doped medium becomes smaller.

* * * * *